United States Patent [19]

Eichorst et al.

[11] Patent Number: 6,074,807
[45] Date of Patent: *Jun. 13, 2000

[54] IMAGING ELEMENT CONTAINING AN ELECTRICALLY-CONDUCTIVE LAYER CONTAINING ACICULAR METAL-CONTAINING PARTICLES AND A TRANSPARENT MAGNETIC RECORDING LAYER

[75] Inventors: Dennis J. Eichorst, Fairport; Debasis Majumdar, Rochester; Paul A. Christian, Pittsford, all of N.Y.

[73] Assignee: Eastman Kodak Company, Rochester, N.Y.

[*] Notice: This patent is subject to a terminal disclaimer.

[21] Appl. No.: 09/173,439

[22] Filed: Oct. 15, 1998

[51] Int. Cl.$^7$ ...................................................... G03C 1/89
[52] U.S. Cl. .......................... 430/529; 430/530; 430/531
[58] Field of Search ................................... 430/527, 529, 430/530, 531

[56] References Cited

U.S. PATENT DOCUMENTS

| | | |
|---|---|---|
| 3,782,947 | 1/1974 | Krall . |
| 4,203,769 | 5/1980 | Guestaux ................................. 430/631 |
| 4,279,945 | 7/1981 | Audran et al. ........................... 430/140 |
| 4,302,523 | 11/1981 | Audran et al. ........................... 430/140 |
| 4,920,167 | 4/1990 | Ruetman et al. ........................ 524/280 |
| 4,999,276 | 3/1991 | Kuwabara et al. ...................... 430/264 |
| 5,006,451 | 4/1991 | Anderson et al. ....................... 430/527 |
| 5,116,666 | 5/1992 | Konno ..................................... 428/220 |
| 5,122,445 | 6/1992 | Ishigaki .................................... 430/527 |
| 5,147,768 | 9/1992 | Sakakibara ............................... 430/140 |
| 5,198,521 | 3/1993 | Ehrhart et al. ............................. 528/48 |
| 5,202,179 | 4/1993 | Kasahara ................................. 428/323 |
| 5,217,804 | 6/1993 | James et al. ............................. 428/329 |
| 5,229,259 | 7/1993 | Yokota ..................................... 430/140 |
| 5,284,714 | 2/1994 | Anderson et al. ....................... 430/527 |
| 5,294,525 | 3/1994 | Yamauchi et al. ....................... 430/530 |
| 5,336,589 | 8/1994 | Mukunoki et al. ...................... 430/501 |
| 5,360,706 | 11/1994 | Anderson et al. ....................... 430/530 |
| 5,366,855 | 11/1994 | Anderson et al. ....................... 430/529 |
| 5,380,584 | 1/1995 | Anderson et al. ....................... 430/903 |
| 5,382,494 | 1/1995 | Kudo et al. ............................... 430/527 |
| 5,391,472 | 2/1995 | Muys et al. .............................. 430/527 |
| 5,413,900 | 5/1995 | Yokota ..................................... 430/495 |
| 5,427,835 | 6/1995 | Morrison et al. ........................ 430/527 |
| 5,427,900 | 6/1995 | James et al. ............................. 430/496 |
| 5,432,050 | 7/1995 | James et al. ............................. 430/496 |
| 5,439,785 | 8/1995 | Boston et al. ........................... 430/530 |
| 5,457,013 | 10/1995 | Christian et al. ........................ 430/496 |
| 5,459,021 | 10/1995 | Ito et al. .................................. 430/527 |
| 5,484,694 | 1/1996 | Lelental et al. .......................... 430/530 |
| 5,498,512 | 3/1996 | James et al. ............................. 430/496 |
| 5,514,528 | 5/1996 | Chen et al. .............................. 430/530 |
| 5,567,740 | 10/1996 | Free ......................................... 521/128 |
| 5,576,163 | 11/1996 | Anderson et al. ....................... 430/529 |
| 5,582,959 | 12/1996 | Ito ............................................ 430/527 |
| 5,656,344 | 8/1997 | Sawa et al. ............................. 428/36.5 |
| 5,665,498 | 9/1997 | Savage et al. ........................... 430/529 |
| 5,674,654 | 10/1997 | Zumbulyadis et al. .................... 430/41 |
| 5,707,791 | 1/1998 | Ito et al. .................................. 430/527 |
| 5,718,995 | 2/1998 | Eichorst et al. ......................... 430/527 |
| 5,719,016 | 2/1998 | Christian et al. ........................ 430/530 |
| 5,731,119 | 3/1998 | Eichorst et al. ......................... 430/529 |
| 5,770,216 | 6/1998 | Mitchnick et al. ...................... 428/402 |

FOREIGN PATENT DOCUMENTS

| | | |
|---|---|---|
| 404091 | 12/1990 | European Pat. Off. . |
| 616252 | 9/1994 | European Pat. Off. . |
| 59/6235 | 1/1984 | Japan . |
| 63/60452 | 3/1988 | Japan . |
| 63/98656 | 4/1988 | Japan . |
| 63/287849 | 11/1988 | Japan . |
| 1262537 | 10/1989 | Japan . |
| 4027937 | 1/1992 | Japan . |
| 4029134 | 1/1992 | Japan . |
| 4062543 | 2/1992 | Japan . |
| 4097339 | 3/1992 | Japan . |
| 6161033 | 6/1994 | Japan . |
| 7168293 | 7/1995 | Japan . |
| 7295146 | 11/1995 | Japan . |
| 9105668 | 5/1991 | WIPO . |

*Primary Examiner*—Richard L. Schilling
*Attorney, Agent, or Firm*—Carl F. Ruoff; Doreen M. Wells

[57] ABSTRACT

The present invention is an imaging element which includes a support, at least one image forming layer superposed on the support, a transparent magnetic recording layer, and at least one electrically-conductive layer. The electrically-conductive layer includes crystalline, electronically-conductive acicular metal-containing particles dispersed in a sulfonated polyurethane film-forming binder. The transparent magnetic recording layer is composed of magnetic particles dispersed in a second film-forming binder and is superposed on the electrically-conductive layer.

13 Claims, No Drawings

IMAGING ELEMENT CONTAINING AN ELECTRICALLY-CONDUCTIVE LAYER CONTAINING ACICULAR METAL-CONTAINING PARTICLES AND A TRANSPARENT MAGNETIC RECORDING LAYER

CROSS REFERENCE TO RELATED APPLICATIONS

This application relates to commonly assigned copending application Ser. No. 09/172,901, filed simultaneously herewith. This application relates to commonly assigned copending application Ser. No. 09/172,897, filed simultaneously herewith. This application relates to commonly assigned copending application Ser. No. 09/172,878, filed simultaneously herewith.

FIELD OF THE INVENTION

This invention relates generally to imaging elements and in particular, to imaging elements including a support, at least one image-forming layer, at least one transparent, electrically-conductive layer, and a transparent magnetic recording layer. More specifically, this invention relates to photographic and thermally-processable imaging elements having one or more imaging layers and a transparent magnetic recording layer in combination with one or more electrically-conductive layers containing electrically-conductive acicular metal-containing colloidal particles dispersed in a sulfonated polyurethane film-forming binder.

BACKGROUND OF THE INVENTION

It is well known to include in various kinds of imaging elements, a transparent layer containing magnetic particles dispersed in a polymeric binder. The inclusion and use of such transparent magnetic recording layers in light-sensitive silver halide photographic elements has been described in U.S. Pat. Nos. 3,782,947; 4,279,945; 4,302,523; 5,217,804; 5,229,259; 5,395,743; 5,413,900; 5,427,900; 5,498,512; and others. Such elements are advantageous because images can be recorded by customary photographic processes while information can be recorded simultaneously into or read from the magnetic recording layer by techniques similar to those employed for traditional magnetic recording art.

A difficulty, however, arises in that magnetic recording layers generally employed by the magnetic recording industry are opaque, not only because of the nature of the magnetic particles, but also because of the requirements that these layers contain other addenda which further influence the optical properties of the layer. Also, the requirements for recording and reading of the magnetic signal from a transparent magnetic layer are more stringent than for conventional magnetic recording media because of the extremely low coverage of magnetic particles required to ensure transparency of the transparent magnetic layer as well as the fundamental nature of the photographic element itself. Further, the presence of the magnetic recording layer cannot interfere with the function of the photographic imaging element.

The transparent magnetic recording layer must be capable of accurate recording and playback of digitally encoded information repeatedly on demand by various devices such as a camera or a photofinishing or printing apparatus. This layer also must exhibit excellent runnability, durability (i.e., abrasion and scratch resistance), and magnetic head-cleaning properties without adversely affecting the image quality of the photographic elements. However, this goal is extremely difficult to achieve because of the nature and concentration of the magnetic particles required to provide sufficient signal to write and read magnetically stored data and the effect of any noticeable color, haze or grain associated with the magnetic layer on the optical density and granularity of the photographic layers. These goals are particularly difficult to achieve when magnetically recorded information is stored and read from the photographic image area. Further, because of the curl of the photographic element, primarily due to the photographic layers and the core set of the support, the magnetic layer must be held more tightly against the magnetic heads than in conventional magnetic recording in order to maintain planarity at the head-media interface during recording and playback operations. Thus, all of these various characteristics must be considered both independently and cumulatively in order to arrive at a commercially viable photographic element containing a transparent magnetic recording layer that will not have a detrimental effect on the photographic imaging performance and still withstand repeated and numerous read-write operations by a magnetic head.

Problems associated with the generation and discharge of electrostatic charge during the manufacture and use of photographic film and paper have been recognized for many years by the photographic industry. The accumulation of charge on film surfaces leads to the attraction of dust, which can produce physical defects. The discharge of accumulated charge during or after the application of the sensitized emulsion layers can produce irregular fog patterns or static marks in the emulsion. The severity of the static problems has been exacerbated greatly by the increases in sensitivity of new emulsions, increases in coating machine speeds, and increases in post-coating drying efficiency. The charge generated during the coating process results primarily from the tendency of webs of high dielectric constant polymeric film base to undergo triboelectric charging during winding and unwinding operations, during transport through the coating machines, and during post-coating operations such as slitting, perforating, and spooling. Static charge can also be generated during the use of the finished photographic product. In an automatic camera, because of the repeated motion of the photographic film in and out of the film cassette, there is the added problem of the generation of electrostatic charge by the movement of the film across the magnetic heads and by the repeated winding and unwinding operations, especially in a low relative humidity environment. The accumulation of charge on the film surface results in the attraction and adhesion of dust to the film. The presence of dust not only can result in the introduction of physical defects and the degradation of the image quality of the photographic element but also can result in the introduction of noise and the degradation of magnetic recording performance (e.g., S/N ratio, "drop-outs", etc.). This degradation of magnetic recording performance can arise from various sources including signal loss resulting from increased head-media spacing, electrical noise caused by discharge of the static charge by the magnetic head during playback, uneven film transport across the magnetic heads, clogging of the magnetic head gap, and excessive wear of the magnetic heads. In order to prevent these problems arising from electrostatic charging, there are various well known methods by which an electrically-conductive layer can be introduced into the photographic element to dissipate any accumulated electrostatic charge.

Antistatic layers containing electrically-conductive agents can be applied to one or both sides of the film base as subbing layers either beneath or on the side opposite to the silver halide emulsion layers. An antistatic layer also can be applied as an outermost layer overlying the emulsion layers or on the side opposite to the emulsion layers or on both sides of the film base. For some applications, it may be advantageous to incorporate the antistatic agent directly into the film base or to introduce it into a silver halide emulsion layer. Typically, in photographic elements of prior art having a transparent magnetic recording layer, the antistatic layer was preferably present as a backing layer underlying the magnetic recording layer.

The use of such electrically-conductive layers containing suitable semi-conductive metal oxide particles dispersed in a film-forming binder in combination with a transparent magnetic recording layer in silver halide imaging elements has been described in the following examples of the prior art. Photographic elements including a transparent magnetic recording layer and a transparent electrically-conductive layer both located on the backside of the film base have been described in U.S. Pat. Nos. 5,147,768; 5,229,259; 5,294,525; 5,336,589; 5,382,494; 5,413,900; 5,457,013; 5,459,021; and others. The conductive layers described in these patents contain fine granular particles of a semi-conductive crystalline metal oxide such as zinc oxide, titania, tin oxide, alumina, indium oxide, silica, complex or compound oxides thereof, and zinc or indium antimonate dispersed in a polymeric film-forming binder. Of these conductive metal oxides, antimony-doped tin oxide and zinc antimonate are preferred. A granular, antimony-doped tin oxide particle commercially available from Ishihara Sangyo Kaisha under the tradename "SN-100P" was disclosed as particularly preferred in Japanese Kokai Nos. 04-062543, 06-161033, and 07-168293.

Preferred average diameters for granular conductive metal oxide particles in such conductive layers was disclosed to be less than 0.5 $\mu$m in U.S. Pat. No. 5,294,525; 0.02 to 0.5 $\mu$m in U.S. Pat. No. 5,382,494; 0.01 to 0.1 $\mu$m in U.S. Pat. Nos. 5,459,021 and 5,457,013; and 0.01 to 0.05 $\mu$m in U.S. Pat. No. 5,457,013. Suitable conductive metal oxide particles exhibit specific volume resistivities of $1\times10^{10}$ ohm-cm or less, preferably $1\times10^{7}$ ohm-cm or less, and more preferably $1\times10^{5}$ ohm-cm or less as taught in U.S. Pat. No. 5,459,021. Another physical property used to characterize crystalline metal oxide particles is the average x-ray crystallite size. The concept of crystallite size is described in detail in U.S. Pat. No. 5,484,694 and references cited therein. Transparent conductive layers containing semiconductive antimony-doped tin oxide granular particles exhibiting a preferred crystallite size of less than 10 nm are taught in U.S. Pat. No. 5,484,694 to be particularly useful in imaging elements. Similarly, photographic elements comprising transparent magnetic layers in combination with conductive layers containing granular conductive metal oxide particle with average crystallite sizes ranging from 1 to 20 nm, preferably 1 to 5 nm, and more preferably from 1 to 3.5 nm are claimed in U.S. Pat. No. 5,459,021. Advantages to using metal oxide particles with small crystallite sizes are disclosed in U.S. Pat. Nos. 5,484,694 and 5,459,021 including the ability to be milled to a very small size without significant degradation of electrical performance, ability to produce a specified level of conductivity at lower weight loadings and/or dry coverages, as well as decreased optical density, decreased brittleness, and decreased cracking of conductive layers containing such particles. Conductive layers containing such metal oxide particles have been applied at the following preferred ranges of dry weight coverages of metal oxide: 3.5 to 10 g/m$^2$; 0.1 to 10 g/m$^2$; 0.002 to 1 g/m$^2$; 0.05 to 0.4 g/m$^2$ as disclosed in U.S. Pat. Nos. 5,382,494; 5,457,013; 5,459,021; and 5,294,525, respectively. Preferred ranges for the metal oxide content in the conductive layers include: 17 to 67% by weight, 43 to 87.5% by weight, and 30 to 40% by volume as disclosed in U.S. Pat. Nos. 5,294,525; 5,382,494; and 5,459,021, respectively.

A photographic element including an electrically-conductive layer containing colloidal "amorphous" silver-doped vanadium pentoxide and a transparent magnetic recording layer has been disclosed in U.S. Pat. Nos. 5,395,743; 5,427,900; 5,432,050; 5,498,512; 5,514,528 and others. This colloidal vanadium oxide is composed of entangled conductive microscopic fibrils or ribbons that are 0.005–0.01 $\mu$m wide, about 0.001 $\mu$m thick, and 0.1–1 $\mu$m in length. Conductive layers containing this colloidal vanadium pentoxide prepared as described in U.S. Pat. No. 4,203,769 can exhibit low surface resistivities at very low weight fractions and dry weight coverages of vanadium oxide, low optical losses, and excellent adhesion of the conductive layer to film supports. However, since colloidal vanadium pentoxide readily dissolves in developer solution during wet processing, it must be protected by a nonpermeable, overlying barrier layer as taught in U.S. Pat. Nos. 5,006,451; 5,284,714; and 5,366,855. Alternatively, a film-forming sulfopolyester latex or a polyesterionomer binder can be combined with colloidal vanadium pentoxide in the conductive layer to minimize degradation during wet processing as taught in U.S. Pat. Nos. 5,427,835 and 5,360,706. Further, when a conductive layer containing colloidal vanadium pentoxide underlies a transparent magnetic layer that is free from reinforcing filler particles, the magnetic layer inherently can serve as a nonpermeable barrier layer. However, if the magnetic layer contains reinforcing filler particles, such as gamma aluminum oxide or silica fine particles, it must be crosslinked using suitable cross-linking agents in order to preserve the desired barrier properties, as taught in U.S. Pat. No. 5,432,050. The use of colloidal vanadium pentoxide dispersed with either a copolymer of vinylidene chloride, acrylonitrile, and acrylic acid or with an aqueous dispersible polyester coated on subbed polyester supports and overcoated with a transparent magnetic recording layer is taught in U.S. Pat. No. 5,514,528. The use of an aqueous dispersible polyurethane or polyesterionomer binder with colloidal vanadium pentoxide in a conductive subbing layer underlying a solvent-coated transparent magnetic layer is taught in U.S. Pat. No. 5,718,995.

Conductive subbing and backing layers for graphic arts films containing "short fibre", "needle-like" or "fibrous" conductive materials have been described in: U.S. Pat. Nos. 5,122,445 and 4,999,276; European Application No. 404,091; and Japanese Kokai No. 04-97339. Suitable fibrous conductive materials include non-conductive fibrous $TiO_2$ particles overcoated with a thin layer of conductive metal oxide fine particles as described in Japanese Kokai No. 59-006235. Preferred conductive fibrous particles were disclosed to exhibit average lengths of 25 $\mu$m and diameters of 0.5 $\mu$m, with a length:diameter ratio of about 3 or greater. Conductive backings for silver halide photographic films containing fibrous conductive metal oxides of Zn, Ti, Sn, Al, In, Si, Mg, Ba, Mo, W or V or multi-component oxides thereof coated at a dry coverage of about 0.3 g/m$^2$ with an optional fluorosurfactant are described in Japanese Kokai Nos. 04-27937 and 04-29134. Other photographic films in which conductive $K_2Ti_6O_{13}$ whiskers available from Otsuka Chemical under the tradename "Dentall WK-100S" are incorporated in subbing, backing or surface protective layers at dry coverages of 0.1–10 g/m² are described in Japanese Kokai No.63-98656. Silver halide laser scanner films containing conductive fibers 10 μm or less in length, 0.3 μm or less in diameter, and having a ratio of length to diameter of 3 or more are disclosed in U.S. Pat. No. 5,582,959. The use of conductive $K_2Ti_6O_{13}$ whiskers 0.05–1 μm in diameter and 1–25 μm in length dispersed in the emulsion layer of such films is disclosed in Japanese Kokai No. 63-287849. Conductive coatings for photographic papers containing fibrous $TiO_2$ particles or $K_2Ti_6O_{13}$ whiskers coated with conductive antimony-doped $SnO_2$ particles have been described in European Application No. 616,252 and Japanese Kokai No. 01-262537.

Thermal media with conductive layers containing fibrous conductive metal oxide particles 0.3 μm in diameter and 10 μm in length are described in Japanese Kokai No. 07-295146. Thermographic media coated with ZnO, $Si_3N_4$ or $K_2Ti_6O_{13}$ conductive whiskers are described in World Patent Application No. 91-05668.

Conductive layers for electrostatic recording films containing fibrous conductive particles are described in U.S. Pat. No. 5,116,666 and Japanese Kokai No. 63-60452. The preferred fibrous conductive particles were disclosed to be obtained commercially from Otsuka Chemical under the tradename "Dentall WK200B". Such particles consist of a thin layer of conductive antimony-doped tin oxide particles deposited on the surface of a nonconductive $K_2Ti_6O_{13}$ core particle. An electrostatic recording paper having a conductive layer containing such conductive $K_2Ti_6O_{13}$ whiskers also has been described in Japanese Kokai, No. 02-307551. An electrophotographic support containing rod-shaped conductive ZnO particles is described in World Patent Application No. 94-25966.

A silver halide photographic film including a transparent magnetic recording layer and a conductive backing or subbing layer containing fibrous $TiO_2$ particles surface-coated with a thin layer of conductive antimony-doped $SnO_2$ particles has been taught in a Comparative Example in U.S. Pat. No. 5,459,021. The average size of the fibrous composite conductive particles was about 0.2 μm in diameter and 2.9 μm in length. Further, the fibrous composite particles were reported to exhibit a crystallite size of 22.3 nm. Such fibrous composite conductive particles are commercially available from Ishihara Sangyo Kaisha under the tradename "FT-2000". However, conductive layers containing these fibrous composite particles also were disclosed to exhibit fine cracks which resulted in decreased conductivity, increased haze, and decreased adhesion compared to similar layers containing granular conductive tin oxide particles.

The use of crystalline, single-phase, acicular, conductive metal-containing particles in transparent conductive layers for various types of imaging elements also containing a transparent magnetic recording layer has been disclosed in U.S. Pat. No. 5,731,119. Suitable acicular, conductive metal-containing particles were disclosed therein to have a cross-sectional diameter of 0.02 μm or less and an aspect ratio (length to cross-sectional diameter) greater than or equal to 5:1. An aspect ratio greater than or equal to 10:1 was disclosed to be preferred.

However, there is a common deficiency in the electrical performance of conductive layers containing either granular or acicular conductive metal-containing particles which is manifested as a substantial decrease in electrical conductivity of such conductive layers after an overlying transparent magnetic recording layer is applied. For example, surface resistivity values were reported in U.S. Pat. No. 5,382,494 for conductive layers containing 75 weight percent or more granular antimony-doped tin oxide particles dispersed in nitrocellulose, cellulose diacetate, or gelatin as binder measured prior to overcoating with a magnetic recording layer as ranging from $1 \times 10^5$ to $1 \times 10^6$ ohms/square for tin oxide dry weight coverages of 3.5 to 12 g/m². However, after overcoating with a magnetic recording layer, the surface resistivity values increased to $1 \times 10^6$ to $1 \times 10^9$ ohms/square. Similarly, surface resistivity values of $1 \times 10^9$ to $1 \times 10^{10}$ ohms/square were reported in U.S. Pat. No. 5,459,021 for conductive subbing layers containing granular antimony-doped tin oxide particles dispersed in gelatin as binder after overcoating with a magnetic recording layer. Conductive subbing layers containing other granular conductive metal oxide particles, such as zinc antimonate, exhibit similar behavior when overcoated with a magnetic recording layer. For example, conductive layers containing less than 75 weight percent zinc antimonate particles dispersed in a vinylidene chloride-based terpolymer latex as binder are reported in U.S. Pat. No. 5,457,013 to exhibit surface resistivity values of $10^8$ ohms/square for total dry weight coverages of about 0.5–0.65 g/m². After overcoating with a magnetic recording layer, the internal resistivity of the conductive layers increased to $1 \times 10^{10}$–$1 \times 10^{11}$ ohms/square. Conductive layers containing 75 weight percent acicular tin oxide particles dispersed in a vinylidene chloride-based terpolymer latex as binder are reported in U.S. Pat. No. 5,719,016 to exhibit surface resistivity values of from $1 \times 10^6$ to $1 \times 10^9$ ohms/square for total dry weight coverages of from 0.6 to 0.2 g/m². After overcoating with a magnetic recording layer as above, the internal resistivity values of such conductive layers are reported in U.S. Pat. No. 5,731,119 to increase to $1 \times 10^8$ to $1 \times 10^{12}$ ohms/square. Thus, in order to maintain a preferred level of conductivity after overcoating with a magnetic recording layer, conductive layers containing either granular or acicular conductive particles need to contain a higher concentration, a higher weight coverage or both of conductive particles than conductive layers which are not overcoated.

Electrically-conductive layers containing both granular and acicular metal-containing particles dispersed in a film-forming binder which did not exhibit a substantial decrease in electrical conductivity after application of an overlying transparent magnetic recording layer are taught in copending commonly assigned U.S. Ser. No. 09/071,967, filed May 1, 1998. The present invention provides similarly improved electrical resistivity performance for an electrically-conductive layer underlying a transparent magnetic recording. Further, conductive layers of the present invention do not require the presence of granular metal-containing particles to obtain the improved performance.

Antistatic or conductive compositions consisting of a sulfonated polyurethane and various salts or surfactants such as those disclosed in U.S. Pat. Nos. 4,920,167; 5,198,521; 5,567,740; 5,656,344; and others are well-known. However, such antistatic compositions are humidity sensitive and the antistatic agent is typically removed by conventional wet photographic processing. Use of sulfonated polyesters in conjunction with polythiophene in an antistatic primer layer has been disclosed in U.S. Pat. No. 5,391,472. Use of sulfonated polyesters in combination with polypyrrole has been disclosed in U.S. Pat. Nos. 5,674,654 and 5,665,498. Use of sulfopolymers or polyesterionomers in conjunction with colloidal vanadium oxide has been disclosed in U.S. Pat. Nos. 5,360,706; 5,380,584; 5,427,835; 5,439,785; 5,576,163; and others.

U.S. Pat. No. 5,707,791 claims a silver halide element having a resin layer consisting of an antistatic agent and an aqueous-dispersible polyester resin or an aqueous-dispersible polyurethane resin, and magnetic layer coated on the resin layer. The antistatic agent is selected from the group consisting of a conductive polymer and a metal oxide. Suitable methods of making the polyurethane water dispersible are disclosed to include introducing a carboxyl group, sulfon group or tertiary amino group into the polyurethane. Furthermore, the conductive polymers indicated are preferably anionic or cationic ionically-conducting polymers.

U.S. Pat. No. 5,382,494 claims a silver halide photographic material having a magnetic recording layer on a backing layer. The backing layer contains inorganic particles of a metal oxide which have at least one surface being water-insoluble, and dispersed in a binder in a proportion of 75.0% to 660% by weight of the binder. Suitable binders include a polyester polyurethane resin, polyether polyurethane resin, polycarbonate polyurethane resin and a polyester resin. It is further disclosed that "the backing layer is allowed to contain an organic particles in place of the inorganic particles."

U.S. Pat. No. 5,294,525 discloses a silver halide photographic material containing a transparent magnetic layer, a conductive layer containing conductive particles and a binder. The binder contains a polar functional group consisting of $—SO_2M$, $—OSO_3M$ and $—P(=O)(OM_1)(OM_2)$ wherein M is hydrogen, sodium, potassium, or lithium; $M_1$ and $M_2$ are the same or different and represent hydrogen, sodium, potassium, lithium, or an alkyl group. Suitable binder resins include polyvinyl chloride resins, polyurethane resins, polyester resins and polyethylene type resins. However, '525 additionally requires the binder for the magnetic layer contain a polar functional group indicated above. The required addition of a polar functional group in the binder of the magnetic layer is undesirable for the physical and chemical properties of the magnetic layer. Furthermore, increased permeability of the magnetic binder can potentially result in chemical change of the magnetic particles and consequently alter the desired magnetic signal.

Use of polyurethanes with hydrophilic properties, as a third component in antistatic primer layers also containing polythiophene and sulfonated polyesters, has been additionally disclosed in U.S. Pat. No. 5,391,472. However, only selected polyurethanes provide electrically-conductive layers which are resistant to an increase in resistivity when overcoated with a magnetic recording layer. In addition, not all types of polyurethanes provide adequate adhesion to underlying and overlying layers. Furthermore, sulfonated polyesters and non-sulfonated hydrophilic polyurethanes were found to provide inferior adhesion performance for an electrically-conductive layer overcoated with a transparent magnetic recording layer as disclosed in U.S. Pat. No. 5,718,995. Thus, the advantages provided by the use of an electrically-conductive layer containing electrically-conductive metal-containing particles and a sulfonated polyurethane binder used in combination with an overlying transparent magnetic recording layer are neither expected from nor anticipated by the prior art.

Because the requirements for an electrically-conductive layer to be useful in an imaging element are extremely demanding, the art has long sought to develop improved conductive layers exhibiting a balance of the necessary chemical, physical, optical, and electrical properties. As indicated hereinabove, the prior art for providing electrically-conductive layers useful for imaging elements is extensive and a wide variety of suitable electroconductive materials have been disclosed. However, there is still a critical need for improved conductive layers which can be used in a wide variety of imaging elements, which can be manufactured at a reasonable cost, which are resistant to the effects of humidity change, which are durable and abrasion-resistant, which do not exhibit adverse sensitometric or photographic effects, which exhibit acceptable adhesion to overlying or underlying layers, which exhibit suitable cohesion, and which are substantially insoluble in solutions with which the imaging element comes in contact, such as processing solutions used for photographic elements. Further, to provide both effective magnetic recording properties and effective electrical-conductivity characteristics in an imaging element, without impairing its imaging characteristics, poses a considerably greater technical challenge.

It is toward the objective of providing a useful combination of a transparent magnetic recording layer overlying an electrically-conductive layer containing metal-containing particles dispersed in a polymeric film-forming binder without causing degradation of the physical or electrical properties of the conductive layer that more effectively meets the diverse needs of imaging elements, especially those of silver halide photographic films and thermally processable imaging elements, but also of a wide variety of other types of imaging elements than those of the prior art that the present invention is directed. Another object is to provide an electrically-conductive layer which is resistant to an increase in electrical resistivity when overcoated with a transparent magnetic recording layer.

SUMMARY OF THE INVENTION

The present invention is an imaging element which includes a support, at least one image forming layer superposed on the support, a transparent magnetic recording layer, and at least one electrically-conductive layer. The electrically-conductive layer includes crystalline, electronically-conductive acicular metal-containing particles dispersed in a sulfonated polyurethane film-forming binder. The transparent magnetic recording layer is composed of magnetic particles dispersed in a second film-forming binder and is superposed on the electrically-conductive layer.

DETAILED DESCRIPTION OF THE INVENTION

This invention provides an improved imaging element for use in an image-forming process containing a support, at least one image-forming layer, a transparent magnetic recording layer, and at least one transparent, electrically-conductive layer, wherein the electrically-conductive layer contains preferably crystalline, electrically-conductive, acicular, metal-containing particles dispersed in a sulfonated polyurethane film-forming binder. Acicular crystalline, electronically-conductive metal-containing particles having a cross-sectional diameter $\leq 0.02$ μm and an aspect ratio (length to cross-sectional diameter) $\geq 5:1$ are the preferred metal-containing conductive particles of the present invention. For imaging elements in which the transparent magnetic recording layer overlies the conductive layer, the increase in resistivity of the conductive layer produced by the application of the magnetic recording layer is substantially less for conductive layers containing acicular, conductive particles dispersed in a sulfonated polyurethane binder than for conductive layers containing acicular, conductive particles dispersed in another type of film-forming binder which is not a sulfonated polyurethane. The increase in resistivity when overcoated with a transparent magnetic recording layer is also substantially reduced for conductive layers containing granular, crystalline, metal-containing particles and a sulfonated polyurethane. Consequently, granular, crystalline, metal-containing particles are also suitable for the present invention. However, the use of acicular particles results in a broader range of suitable volume concentrations that provide acceptable electrical conductivity than the use of granular particles. Thus, the benefits of the present invention are best demonstrated by the preferred acicular particles and reference to acicular particles will be made throughout. Imaging elements in accordance with this invention can be of many different types depending on the particular use for which they are intended. Such elements can include, for example, photographic, thermographic, electrothermographic, photothermographic, dielectric recording, dye migration, dye-ablation, thermal dye transfer, electrostatographic, electrophotographic, thermally-processable imaging elements, and others. Detailed descriptions of the structure and function of each of these imaging elements are provided in U.S. Pat. No. 5,731,119 and incorporated herein by reference. The present invention can be practiced effectively in conjunction with any of the various imaging elements described therein.

Photographic elements which can be provided with an electrically-conductive layer in accordance with this invention can differ widely in structure and composition. For example, they can vary greatly with regard to the type of support, the number and composition of image-forming layers, and the number and types of auxiliary layers included in the elements. In particular, photographic elements can be still films, motion picture films, x-ray films, graphic arts films, paper prints or microfiche. They also can be black-and-white elements, color elements adapted for use in a negative-positive process or color elements adapted for use in a reversal process.

Acicular, conductive metal-containing particles used in accordance with this invention are preferably single phase, crystalline, and have nanometer-size dimensions. Suitable dimensions for these acicular particles are less than 0.050 $\mu$m in cross-sectional diameter (minor axis) and less than 1 $\mu$m in length (major axis), preferably less than 0.020 $\mu$m in cross-sectional diameter and less than 0.500 $\mu$m in length, and more preferably less than 0.010 $\mu$m in cross-sectional diameter and less than 0.150 $\mu$m in length. These dimensions tend to minimize optical losses of coated layers containing such particles due to Mie-type scattering by the particles. A mean aspect ratio (major/minor axes) of at least 2:1 is suitable; a mean aspect ratio of greater than or equal to 5:1 is preferred; and a mean aspect ratio of greater than or equal to 10:1 is more preferred. An increase in mean aspect ratio of acicular conductive particles results in an improvement in the volumetric efficiency of conductive network formation.

As disclosed in U.S. Pat. No. 5,719,016, one particularly useful class of acicular, electrically-conductive, metal-containing particles is acicular, semiconductive metal oxide particles. Acicular, semiconductive metal oxide particles suitable for use in the conductive layers of this invention exhibit specific (volume) resistivity values ranging from about $1\times10^{-2}$ to $1\times10^{4}$ ohm·cm and more preferably from about $1\times10^{-1}$ to $1\times10^{3}$ ohm·cm. One example of a preferred acicular semiconductive metal oxide is the acicular electroconductive tin oxide described in U.S. Pat. No. 5,575,957 which is available under the tradename "FS-10P" from Ishihara Techno Corporation. This electroconductive tin oxide consists of acicular particles of single phase, crystalline tin oxide doped with about 0.3–5 atom percent antimony. The specific (volume) resistivity of the FS-10P acicular tin oxide ranges from about 10 to 100 ohm·cm when measured as a packed powder using a DC two-probe test cell similar to that described in U.S. Pat. No. 5,236,737. The mean dimensions of the acicular tin oxide particles determined by image analysis of transmission electron micrographs are approximately 0.010 $\mu$m in cross-sectional diameter and 0.100 $\mu$m in length with a mean aspect ratio of about 10:1. An x-ray powder diffraction analysis of the FS-10P acicular tin oxide has confirmed that it is single phase and highly crystalline. The typical mean value for x-ray crystallite size determined in the manner described in U.S. Pat. No. 5,484,694 is about 200 Å for the as-supplied dry powder. Other suitable acicular electroconductive metal oxides include, for example, a tin-doped indium sesquioxide similar to that described in U.S. Pat. No. 5,580,496, but having a smaller mean cross-sectional diameter; an aluminum-doped zinc oxide; a niobium-doped titanium dioxide; an oxygen-deficient titanium suboxide, $TiO_x$, where x<2; and a titanium oxynitride, $TiO_xN_y$, where $(x+y)\leq2$, similar to those phases described in U.S. Pat. No. 5,320,782. Additional examples of other suitable non-oxide, acicular, electronically-conductive, metal-containing particles include selected transition metal carbides, metal nitrides, metal silicides, metal borides, and metal pnictides.

One class of conductive metal-containing granular particles particularly useful for the electrically-conductive layers of this invention are semiconductive metal oxide particles. Other examples of useful electrically-conductive, metal-containing granular particles include selected metal carbides, nitrides, suicides, and borides. Examples of suitable semiconductive metal oxides include: zinc oxide, titania, tin oxide, alumina, indium sesquioxide, zinc antimonate, indium antimonate, silica, magnesia, zirconia, barium oxide, molybdenum trioxide, tungsten trioxide, and vanadium pentoxide.

The small average dimensions of acicular metal-containing conductive particles in accordance with this invention minimize the amount of light scattering and results in increased optical transparency and decreased haze for conductive layers in which they are incorporated. The higher effective aspect ratio of the preferred acicular conductive particles results in greater efficiency of conductive network formation compared to granular conductive particles of comparable cross-sectional diameter. The volume concentration of acicular metal-containing particles in conductive layers suitable for use in imaging elements of this invention can range from about 2 to 70 volume percent. The concentration of conductive particles is defined in terms of volume percent rather than weight percent since the densities of the various suitable conductive acicular and granular particles can vary for different particle compositions. The use of significantly less than about 2 volume percent acicular conductive particles will not provide a useful level of electrical conductivity. The volume concentration of granular metal-containing particles in conductive layers suitable for use in imaging elements of this invention can range from about 20 to 70 volume percent. The optimum concentration of either granular or acicular conductive particles depends on primary particle size, agglomerate size, polymeric binder, as well as the conductivity requirements of the particular imaging element.

As described hereinabove, a common deficiency in the electrical performance of conductive layers of prior art containing metal-containing conductive particles is manifested as a substantial increase in electrical resistivity when an additional overlying layer, such as a protective overcoat or topcoat, an abrasion-resistant backing, a gelatin-containing pelloid, an emulsion layer or a magnetic recording layer has been applied to the conductive layers. Furthermore, this change in electrical resistivity of the conductive layer suggests a lack of robustness of the extended conductive network in the conductive layer. Rewetting of the surface of the conductive layer and penetration by coating solvent into the bulk of the conductive layer during the application of the overlying layer can cause swelling of the binder of the conductive layer and intermixing of the layers at the common interface thus producing an undesirable increase in electrical resistivity of the conductive layer. The magnitude of this observed increase in electrical resistivity depends on a variety of factors including binder selection for both layers, coating solvent selection, volumetric concentration of conductive particles in the conductive layer, type of conductive particle, total dry weight coverage for both layers, drying conditions for both layers, and other process-related factors. One advantage provided by the conductive layers of the present invention, which contain acicular conductive particles dispersed in a sulfonated polyurethane film-forming binder, is the minimization of the magnitude of this increase in resistivity compared to that observed for conductive layers of prior art containing conductive particles at the same total volume concentrations and dry weight coverages of conductive particles dispersed in a film-forming binder which is not a sulfonated polyurethane.

The preferred sulfonated polyurethane binder is an anionic aliphatic polyurethane dispersion in water. The preparation of polyurethanes in general and, water-dispersible polyurethanes in particular, is well known and described, for example, in U.S. Pat. Nos. 4,307,219, 4,408,008, and 3,998,870. Water-dispersible polyurethanes can be prepared by chain extending a prepolymer containing terminal isocyanate groups with a chain extension agent (an active hydrogen compound, usually a diamine or diol). The prepolymer is formed by reacting a diol or polyol having terminal hydroxyl groups with excess diisocyanate or polyisocyanate. To permit dispersion in water, water-solubilizing/dispersing groups are introduced either into the prepolymer prior to chain extension or are introduced as part of the chain extension agent. For the purpose of the present invention, suitable polyurethanes contain sulfonate groups as the water-solubilizing/dispersing groups. The suitable polyurethanes may also contain a combination of sulfonate groups and nonionic groups such as pendant polyethylene oxide chains as the water-solubilizing/dispersing groups. The sulfonate groups may be introduced by using sulfonate-containing diols or polyols, sulfonate-containing-diisocyanates or polyisocyanates or sulfonate-containing-chain extension agents such as a sulfonate-containing diamines in the preparation of the water-dispersible polyurethane.

Incorporation of either a polyester resin or polyurethane resin in an antistatic layer which is overcoated with a magnetic recording layer for use in a photographic light-sensitive material has been disclosed in U.S. Pat. No. 5,707,791. U.S. Pat. No. 5,457,013 discloses and claims an electrically conductive layer containing zinc antimonate and a polyurethane binder underlying a transparent magnetic recording layer. Use of polyurethanes with hydrophilic properties, as a third component in antistatic primer layers containing polythiophene and sulfonated polyesters, has been additionally disclosed in U.S. Pat. No. 5,391,472. Furthermore the use of either sulfonated polyesters or sulfonated polyurethanes in combination with either electronically conductive polymers or colloidal vanadium oxide has been disclosed in U.S. Pat. Nos. 5,391,472; 5,674,654; 5,665,498; 5,360,706; 5,380,584; 5,427,835; 5,439,785; 5,576,163; 5,707,792; and others. However, the use of such sulfonated polyesters or polyesterionomers results in unacceptable performance relative to sulfonated polyurethanes in accordance with the present invention. Further, other polyurethanes fail to provide electrically-conductive layers which are resistant to a resistivity increase when overcoated with a magnetic recording layer. In addition, sulfonated polyesters and non-sulfonated aqueous-dispersible polyurethanes were disclosed in U.S. Pat. No. 5,718,995 to provide inadequate adhesion for an electrically-conductive layer overcoated with a transparent magnetic recording layer. Thus, the results obtained, in accordance with the present invention for an electrically-conductive layer containing metal-containing particles and a sulfonated polyurethane used in combination with a transparent magnetic recording layer are neither known nor anticipated by the disclosures of hereinabove mentioned U.S. patents.

Optional polymeric film-forming co-binders suitable for use in conductive layers of this invention include: water-soluble, hydrophilic polymers such as gelatin, gelatin derivatives, maleic acid anhydride copolymers; cellulose derivatives such as carboxymethyl cellulose, hydroxyethyl cellulose, cellulose acetate butyrate, diacetyl cellulose or triacetyl cellulose; synthetic hydrophilic polymers such as polyvinyl alcohol, poly-N-vinylpyrrolidone, acrylic acid copolymers, polyacrylamide, their derivatives and partially hydrolyzed products, vinyl polymers and copolymers such as polyvinyl acetate and polyacrylate acid ester; derivatives of the above polymers; and other synthetic resins. Other suitable cobinders include aqueous emulsions of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, interpolymers of styrene, interpolymers of styrene sulfonate, copolymers of sulfonated styrene/maleic anhyrdride, acrylonitrile and methacrylonitrile, vinyl acetates, vinyl ethers, vinyl and vinylidene halides, and olefins and aqueous dispersions of non-sulfonated polyurethanes or polyesterionomers. Gelatin and gelatin derivatives, non-sulfonated polyurethanes, polyesterionomers, aqueous emulsions of vinylidene halide interpolymers, interpolymers of styrene, interpolymers of styrene sulfonate, and copolymers of sulfonated styrene/maleic anhydride are the preferred cobinders.

Solvents useful for preparing dispersions and coatings containing acicular metal-containing conductive particles by the method of this invention include: water; alcohols such as methanol, ethanol, propanol, isopropanol; ketones such as acetone, methylethyl ketone, and methylisobutyl ketone; esters such as methyl acetate, and ethyl acetate; glycol ethers such as methyl cellusolve, ethyl cellusolve; ethylene glycol, and mixtures thereof. Preferred solvents include water, alcohols, and acetone.

In addition to acicular metal-containing particles and a sulfonated polyurethane binder, other components that are well known in the photographic art also can be included in the conductive layer of this invention. Other addenda, such as matting agents, surfactants or coating aids, charge control agents, polymer lattices to improve dimensional stability, thickeners or viscosity modifiers, hardeners or cross linking agents, soluble antistatic agents, soluble and/or solid particle dyes, antifoggants, lubricating agents, and various other conventional additives optionally can be present in any or all of the layers of the multilayer imaging element.

Dispersions of acicular metal-containing conductive particles and a sulfonated polyurethane binder in a suitable liquid vehicle can be prepared in the presence of appropriate levels of optional dispersing aids, colloidal stabilizing agents or polymeric co-binders by any of various wet milling processes well-known in the art of pigment dispersion and paint making. Liquid vehicles useful for preparing such dispersions include water; aqueous salt solutions; alcohols such as methanol, ethanol, propanol, butanol; ethylene glycol; and other solvents described hereinabove. The dispersing aid can be chosen from a wide variety of surfactants and surface modifiers such as those described in U.S. Pat. No. 5,145,684, for example. The dispersing aid can be present in an amount ranging from 0.1 to 20% of the dry weight of the conductive particles.

Colloidal dispersions of acicular metal-containing conductive particles in suitable liquid vehicles can be formulated with a sulfonated polyurethane film-forming binder and various addenda and applied to a variety of supports to form the electrically-conductive layers of this invention. Typical photographic film supports include: cellulose nitrate, cellulose acetate, cellulose acetate butyrate, cellulose acetate propionate, poly(vinyl acetal), poly(carbonate), poly(styrene), poly(ethylene terephthalate), poly(ethylene naphthalate) or poly(ethylene naphthalate) having included therein a portion of isophthalic acid, 1,4-cyclohexane dicarboxylic acid or 4,4-biphenyl dicarboxylic acid used in the preparation of the film support; polyesters wherein other glycols are employed such as, for example, cyclohexanedimethanol, 1,4-butanediol, diethylene glycol, polyethylene glycol; ionomers as described in U.S. Pat. No. 5,138,024, incorporated herein by reference, such as polyester ionomers prepared using a portion of the diacid in the form of 5-sodiosulfo-1,3-isophthalic acid or like ion containing monomers, polycarbonates, and the like; blends or laminates of the above polymers. Supports can be either transparent or opaque depending upon the application. Transparent film supports can be either colorless or colored by the addition of a dye or pigment. Film supports can be surface-treated by various processes including corona discharge, glow discharge, UV exposure, flame treatment, electron-beam treatment, as described in U.S. Pat. No. 5,718,995 or treatment with adhesion-promoting agents including dichloro- and trichloroacetic acid, phenol derivatives such as resorcinol and p-chloro-m-cresol, solvent washing or overcoated with adhesion promoting primer or tie layers containing polymers such as vinylidene chloride-containing copolymers, butadiene-based copolymers, glycidyl acrylate or methacrylate-containing copolymers, maleic anhydride-containing copolymers, condensation polymers such as polyesters, polyamides, polyurethanes, polycarbonates, mixtures and blends thereof, and the like. Other suitable opaque or reflective supports are paper, polymer-coated paper, including polyethylene-, polypropylene-, and ethylene-butylene copolymer-coated or laminated paper, synthetic papers, pigment-containing polyesters, and the like. Of these supports, films of cellulose triacetate, poly(ethylene terephthalate), and poly(ethylene naphthalate) prepared from 2,6-naphthalene dicarboxylic acids or derivatives thereof are preferred. The thickness of the support is not particularly critical. Support thicknesses of 2 to 10 mils (50 $\mu$m to 254 $\mu$m) are suitable for photographic elements in accordance with this invention.

Dispersions containing acicular metal-containing conductive particles, a sulfonated polyurethane film-forming binder, and various additives in a suitable liquid vehicle can be applied to the aforementioned film or paper supports using any of a variety of well-known coating methods. Handcoating techniques include using a coating rod or knife or a doctor blade. Machine coating methods include air doctor coating, reverse roll coating, gravure coating, curtain coating, bead coating, slide hopper coating, extrusion coating, spin coating and the like, as well as other coating methods known in the art.

The electrically-conductive layer of this invention can be applied to the support at any suitable coverage depending on the specific requirements of a particular type of imaging element. For example, for silver halide photographic films, total dry coating weights of antimony-doped tin oxide in the conductive layer are preferably in the range of from about 0.01 to 2 g/m$^2$. More preferred dry weight coverages are in the range of about 0.02 to 1 g/m$^2$. The conductive layer of this invention typically exhibits a surface resistivity (20% RH, 20° C.) of less than $1\times10^{10}$ ohms/square, preferably less than $1\times10^9$ ohms/square, and more preferably less than $1\times10^8$ ohms/square.

Imaging elements including a transparent magnetic recording layer are well known in the imaging art as described hereinabove. Such a transparent magnetic recording layer can contain a polymeric film-forming binder, ferromagnetic particles, and other optional addenda for improved manufacturabilty or performance such as dispersants, coating aids, fluorinated surfactants, crosslinking agents or hardeners, catalysts, charge control agents, lubricants, abrasive particles, filler particles, and the like as described, for example, in Research Disclosure, Item No. 34390 (November, 1992).

Suitable ferromagnetic particles include ferromagnetic iron oxides, such as: $\gamma$-Fe$_2$O$_3$, Fe$_3$O$_4$; $\gamma$-Fe$_2$O$_3$ or Fe$_3$O$_4$ bulk-doped or surface-treated with Co, Zn, Ni or other metals; ferromagnetic chromium dioxides such as CrO$_2$ or CrO$_2$ doped with Li, Na, Sn, Pb, Fe, Co, Ni, Zn or halogen atoms in solid solution; ferromagnetic transition metal ferrites; ferromagnetic hexagonal ferrites, such as barium and strontium ferrite; and ferromagnetic metal alloys with oxide coatings on their surface to improve chemical stability and/or dispersability. In addition, ferromagnetic oxides with a shell of a lower refractive index particulate inorganic material or a polymeric material with a lower optical scattering cross-section as taught in U.S. Pat. Nos. 5,217,804 and 5,252,444 can be used. Suitable ferromagnetic particles exhibit a variety of sizes, shapes and aspect ratios. The preferred ferromagnetic particles for magnetic recording layers used in combination with the conductive layers of this invention are cobalt surface-treated y-iron oxide with a specific surface area greater than 30 m$^2$/g.

As taught in U.S. Pat. No. 3,782,947, whether an element is useful for both photographic and magnetic recording depends on the size distribution and concentration of the ferromagnetic particles as well as the relationship between the granularities of the magnetic and the photographic layers. Generally, the coarser the grain of the silver halide emulsion in the photographic element containing a magnetic recording layer, the larger the mean size of the magnetic particles which are suitable. A magnetic particle coverage of from about 10 to 1000 mg/m$^2$, when uniformly distributed across the imaging area of a photographic imaging element, provides a magnetic recording layer that is suitably transparent to be useful for photographic imaging applications for particles with a maximum dimension of less than about 1 $\mu$m. Magnetic particle coverages less than about 10 mg/m$^2$ tend to be insufficient for magnetic recording purposes. Magnetic particle coverages greater than about 1000 mg/m$^2$ tend to produce magnetic recording layers with optical densities too high for photographic imaging. Particularly useful particle coverages are in the range of 20 to 70 mg/m². Coverages of about 20 mg/m² are particularly useful in magnetic recording layers for reversal films and coverages of about 40 mg/m² are particularly useful in magnetic recording layers for negative films. Magnetic particle concentrations of from about $1\times10^{-11}$ to $1\times10^{-10}$ mg/$\mu$m³ are preferred for transparent magnetic recording layers prepared for use in accordance with this invention.

Suitable polymeric binders for use in the magnetic recording layer include, for example: vinyl chloride-based copolymers such as, vinyl chloride-vinyl acetate copolymers, vinyl chloride-vinyl acetate-vinyl alcohol terpolymers, vinyl chloride-vinyl acetate-maleic acid terpolymers, vinyl chloride-vinylidene chloride copolymers, vinyl chloride-acrylonitrile copolymers; acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-acrylic acid terpolymers, acrylonitrile-butadiene-methacrylic acid terpolymers, polyvinyl butyral, polyvinyl acetal, cellulose derivatives such as cellulose esters including cellulose acetate, cellulose diacetate, cellulose triacetate, cellulose acetate butyrate, cellulose acetate proprionate; and styrene-butadiene copolymers, polyester resins, phenolic resins, thermosetting polyurethane resins, melamine resins, alkyl resins, urea-formaldehyde resins and the like. Preferred binders for organic solvent-coated transparent magnetic recording layers are polyurethanes, vinyl chloride-based copolymers, and cellulose esters, particularly cellulose diacetate and cellulose triacetate.

Binders for transparent magnetic recording layers also can be film-forming hydrophilic polymers such as water soluble polymers, cellulose ethers, latex polymers and water-dispersible polyesters as described in *Research Disclosures* No. 17643 and 18716 and U.S. Pat. Nos. 5,147,768; 5,457,012; 5,520,954 and 5,531,913. Suitable water-soluble polymers include gelatin, gelatin derivatives, casein, agar, starch, polyvinyl alcohol, acrylic acid copolymers, and maleic acid anhydride. Suitable cellulose ethers include carboxymethyl cellulose and hydroxyethyl cellulose. Other suitable aqueous binders include aqueous lattices of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl chloride copolymers and vinylidene chloride copolymers, and butadiene copolymers and aqueous dispersions of polyurethanes or polyesterionomers. Preferred hydrophilic binders include gelatin, gelatin derivatives, and combinations of gelatin with a polymeric cobinder. Preferred gelatins include alkali- or acid-treated gelatins.

The binder in the magnetic recording layer can be optionally cross-linked. Binders which contain active hydrogen atoms including —OH, —NH₂, —NHR, where R is an organic radical, and the like, can be crosslinked using an isocyanate or polyisocyanate as described in U.S. Pat. No. 3,479,310. Suitable polyisocyanates include: tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, and polymers thereof; polyisocyanates prepared by reacting an excess of an organic diisocyanate with an active hydrogen containing compounds such as polyols, polyethers and polyesters and the like, including ethylene glycol, propylene glycol, dipropylene glycol, butylene glycol, trimethylol propane, hexanetriol, glycerine sorbitol, pentaerythritol, castor oil, ethylenediamine, hexamethylenediamine, ethanolamine, diethanolamine, triethanolamine, water, ammonia, urea, and the like, including biuret compounds, allophanate compounds, and the like. One preferred polyisocyanate crosslinking agent is the reaction product of trimethylol propane and 2,4-tolylene diisocyanate sold by Mobay under the tradename Mondur CB 75.

Further, hydrophilic binders can be hardened using any of a variety of means known to one skilled in the art. Useful hardening agents include aldehyde compounds such as formaldehyde, ketone compounds, isocyanates, aziridine compounds, epoxy compounds, chrome alum, zirconium sulfate, and the like.

Examples of suitable solvents for coating the magnetic recording layer include: water; ketones, such as acetone, methyl ethyl ketone, methylisobutyl ketone, and cyclohexanone; alcohols, such as methanol, ethanol, isopropanol, and butanol; esters such as ethyl acetate and butyl acetate, ethers; aromatic solvents, such as toluene; and chlorinated hydrocarbons, such as carbon tetrachloride, chloroform, dichloromethane; trichloromethane, trichloroethane, tetrahydrofuran; glycol ethers such as ethylene glycol monomethyl ether, and propylene glycol monomethyl ether; and ketoesters, such as methylacetoacetate. Optionally, due to the requirements of binder solubility, magnetic dispersability and coating rheology, a mixture of solvents may be advantageous. One preferred solvent mixture consists of a chlorinated hydrocarbon, ketone and/or alcohol, and ketoesters. Another preferred solvent mixture consists of a chlorinated hydrocarbon, ketone and/or alcohols, and a glycol ether. Other preferred solvent mixtures include dichloromethane, acetone and/or methanol, methylacetoacetate; dichloromethane, acetone and/or methanol, propylene glycol monomethyl ether; and methylethyl ketone, cyclohexanone and/or toluene. For hydrophilic binders and water-soluble binders, such as gelatin, water is the preferred solvent.

As indicated hereinabove, the magnetic recording layer also can contain additional optional components such as dispersing agents, wetting agents, surfactants or fluorinated surfactants, coating aids, viscosity modifiers, soluble and/or solid particle dyes, antifoggants, matte particles, lubricants, abrasive particles, filler particles, antistatic agents, and other addenda that are well known in the photographic and magnetic recording arts.

The transparent magnetic recording layer can be positioned in an imaging element in any of various positions. For example, it can overlie one or more image-forming layers, or underlie one or more image forming layers, or be interposed between image-forming layers, or serve as a subbing layer for an image-forming layer, or be coated on the side of the support opposite to an image-forming layer. In a silver halide photographic element, the transparent magnetic layer is preferably on the side of the support opposite the silver halide emulsion.

Conductive layers of this invention can be incorporated into multilayer imaging elements in any of various configurations depending upon the requirements of the specific imaging element. Preferably, the conductive layer of this invention is present as a subbing or tie layer underlying the magnetic recording layer on the side of the support opposite the imaging layer(s). However, conductive layers of this invention also can be overcoated with layers other than a transparent magnetic recording layer (e.g., abrasion-resistant backing layer, curl control layer, pelloid, etc.) in order to minimize the increase in the resistivity of the conductive layer after overcoating. Further, additional conductive layers also can be provided on the same side of the support as the imaging layer(s) or on both sides of the support. An optional conductive subbing layer can be applied either underlying or overlying a gelatin subbing layer containing an antihalation dye or pigment. Alternatively, both antihalation and antistatic functions can be combined in a single layer containing conductive particles, antihalation dye, and a binder. Such a hybrid layer is typically coated on the same side of the support as the sensitized emulsion layer. Additional optional layers can be present as well. An additional conductive layer can be used as an outermost layer of an imaging element, for example, as a protective layer overlying an image-forming layer. When a conductive layer is applied over a sensitized emulsion layer, it is not necessary to apply any intermediate layers such as barrier or adhesion-promoting layers between the conductive overcoat layer and the imaging layer(s), although they can optionally be present. Other addenda, such as polymer lattices to improve dimensional stability, hardeners or cross-linking agents, surfactants, matting agents, lubricants, and various other well-known additives can be present in any or all of the above mentioned layers.

Conductive layers of this invention underlying a transparent magnetic recording layer typically exhibit an internal resistivity of less than $1 \times 10^{10}$ ohms/square, preferably less than $1 \times 10^9$ ohms/square, and more preferably, less than $1 \times 10^8$ ohms/square.

The imaging elements of this invention can be of many different types depending on the particular use for which they are intended. Such imaging elements include, for example, photographic, thermographic, electrothermographic, photothermographic, dielectric recording, dye migration, laser dye-ablation, thermal dye transfer, electrostatographic, electrophotographic imaging elements, and others described hereinabove. Suitable photosensitive image-forming layers are those which provide color or black and white images. Such photosensitive layers can be image-forming layers containing silver halides such as silver chloride, silver bromide, silver bromoiodide, silver chlorobromide and the like. Both negative and reversal silver halide elements are contemplated. For reversal films, the emulsion layers described in U.S. Pat. No. 5,236,817, especially Examples 16 and 21, are particularly suitable. Any of the known silver halide emulsion layers, such as those described in Research Disclosure, Vol. 176, Item 17643 (December, 1978), Research Disclosure, Vol. 225, Item 22534 (January, 1983), Research Disclosure, Item 36544 (September, 1994), and Research Disclosure, Item 37038 (February, 1995) and the references cited therein are useful in preparing photographic elements in accordance with this invention.

In a particularly preferred embodiment, imaging elements comprising the electrically-conductive layers of this invention are photographic elements which can differ widely in structure and composition. For example, said photographic elements can vary greatly with regard to the type of support, the number and composition of the image-forming layers, and the number and types of auxiliary layers that are included in the elements. In particular, photographic elements can be still films, motion picture films, x-ray films, graphic arts films, paper prints or microfiche. It is also specifically contemplated to use the conductive layer of the present invention in small format films as described in Research Disclosure, Item 36230 (June 1994). Photographic elements can be either simple black-and-white or monochrome elements or multilayer and/or multicolor elements adapted for use in a negative-positive process or a reversal process. Generally, the photographic element is prepared by coating one side of the film support with one or more layers comprising a dispersion of silver halide crystals in an aqueous solution of gelatin and optionally one or more subbing layers. The coating process can be carried out on a continuously operating coating machine wherein a single layer or a plurality of layers are applied to the support. For multicolor elements, layers can be coated simultaneously on the composite film support as described in U.S. Pat. Nos. 2,761,791 and 3,508,947. Additional useful coating and drying procedures are described in Research Disclosure, Vol. 176, Item 17643 (December, 1978).

Imaging elements incorporating conductive layers in combination with a transparent magnetic recording layer in accordance with this invention also can contain additional layers including adhesion-promoting layers, lubricant or transport-controlling layers, hydrophobic barrier layers, antihalation layers, abrasion and scratch protection layers, and other special function layers. Imaging elements in accordance with this invention incorporating a conductive layer in combination with a transparent magnetic recording layer useful for specific imaging applications such as color negative films, color reversal films, black-and-white films, color and black-and-white papers, electrographic media, dielectric recording media, thermally processable imaging elements, thermal dye transfer recording media, laser ablation media, and other imaging applications should be readily apparent to those skilled in photographic and other imaging arts.

The present invention is illustrated by the following detailed examples of its practice. However, the scope of this invention is by no means restricted to these illustrative examples.

EXAMPLES 1–3

Aqueous antistatic coating formulations containing acicular antimony-doped tin oxide conductive particles with mean dimensions of 0.010 μm in cross-sectional diameter and about 0.100 μm in length (by TEM), an aqueous dispersed sulfonated polyurethane binder, and various other additives described below were prepared at nominally 3.5% total solids by weight. The weight ratios of acicular tin oxide to sulfonated polyurethane binder were nominally 70:30, 60:40, and 50:50 for the conductive layers of Examples 1, 2, and 3, respectively. The coating formulations are given below:

|  | Weight % (wet) | | |
| --- | --- | --- | --- |
| Component | Ex. 1 | Ex. 2 | Ex. 3 |
| Acicular tin oxide[1] | 2.378 | 1.900 | 1.755 |
| Sulfonated polyurethane[2] | 1.019 | 1.583 | 1.755 |
| Wetting aid[3] | 0.100 | 0.100 | 0.100 |
| Deionized water | 96.503 | 96.417 | 96.390 |

[1]FS-10D, Ishihara Techno Corp.
[2]Bayhydrol PR 240, Bayer Corp.
[3]Pluronic F88, BASF Corp.

The above coating formulations were applied to a moving web of 4 mil (100 μm) thick poly(ethylene naphthalate) film support using a coating hopper so as to provide nominal total dry coverages of 1 g/m² (Examples 1a, 2a, and 3a), 0.6 g/m²

(Examples 1b, 2b, and 3b), and 0.3 g/m² (Examples 1c, 2c, and 3c). The film support had been coated previously with a typical primer layer consisting of a terpolymer latex of acrylonitrile, vinylidene chloride, and acrylic acid.

Surface electrical resistivity (SER) of the conductive layers was measured at nominally 20° C. and 50% relative humidity using a two-point DC electrode method similar to that described in U.S. Pat. No. 2,801,191. For adequate antistatic performance, conductive layers with SER values of 10 log ohms/square or less are preferred.

The conductive layers of Examples 1–3 prepared hereinabove were overcoated with a transparent magnetic recording layer as described in *Research Disclosure,* Item 34390, November, 1992. The particular transparent magnetic recording layer employed contains cobalt surface-modified $\gamma$-$Fe_2O_3$ particles in a polymeric binder which optionally may be cross-linked and optionally may contain suitable abrasive particles. The polymeric binder consists of a blend of cellulose diacetate and cellulose triacetate. The binder was not crosslinked in the present examples. The magnetic recording layer was applied so as to provide a nominal total dry coverage of 1.5 g/m². An optional lubricant-containing topcoat layer comprising carnauba wax and a fluorinated surfactant as a wetting aid may be applied over the transparent magnetic recording layer to provide a nominal dry coverage of about 0.02 g/m². The resultant multilayer structure including an electrically-conductive antistatic layer overcoated with a transparent magnetic recording layer, an optional lubricant layer, and other optional layers is referred to herein as a "magnetic backing package."

The electrical performance of the magnetic backing package was evaluated by measuring the internal electrical resistivity of the conductive layer using a salt bridge wet electrode resistivity (WER) measurement technique (as described, for example, in "Resistivity Measurements on Buried Conductive Layers" by R. A. Elder, pages 251–254, 1990 *EOS/ESD Symposium Proceedings*). Typically, conductive layers with WER values greater than about 12 log ohm/square are considered to be ineffective at providing static protection for photographic imaging elements. WER values less than about 10 log ohm/square are preferred. In addition to WER values, the change in resistivity of the conductive layer after overcoating with the magnetic recording layer ($\Delta R=WER-SER$) is also a measure of the robustness of the conductive network in the conductive layer.

The optical and ultraviolet transparency of the conductive layers prepared as described herein were evaluated. Total optical (ortho) and ultraviolet densities ($D_{min}$) were evaluated at 530 nm and 380 nm, respectively, using a X-Rite Model 361T B&W transmission densitometer. Net or $\Delta$UV $D_{min}$ and net or $\Delta$Ortho $D_{min}$ values for the magnetic backing packages were calculated by correcting the total ultraviolet and optical $D_{min}$ values for contributions from the support and any optional primer layers.

Dry adhesion performance of the magnetic backing package was evaluated by scribing a small cross-hatched region into the coating with a razor blade. A piece of high-tack adhesive tape was placed over the scribed region and quickly removed. The relative amount of coating removed is a qualitative measure of the dry adhesion. Wet adhesion performance of the magnetic backing package was evaluated using a procedure which simulates wet processing of silver halide photographic elements. A one millimeter wide line was scribed into a sample of the backings package. The sample was then immersed in KODAK Flexicolor developer solution at 38° C. and allowed to soak for 3 minutes and 15 seconds. The test sample was removed from the heated developer solution and then immersed in another bath containing Flexicolor developer at about 25° C. A rubber pad (approximately 3.5 cm dia.) loaded with a 900 g weight was rubbed vigorously back and forth across the sample in the direction perpendicular to the scribed line. The relative amount of additional material removed is a qualitative measure of the wet adhesion of the various layers.

Descriptions of the conductive layer in the magnetic backing packages, the corresponding internal resistivity (WER) values, $\Delta R$ values, dry adhesion performance and wet adhesion performance results, and net ultraviolet and optical densities ($\Delta D_{min}$) are given in Table 1.

TABLE 1

Conductive layers overcoated with transparent magnetic recording layers

| Sample | wt % metal oxide | Covg. g/m² | WER log ohm/sq | Delta R log ohm/sq | Dry adhesion | Wet adhesion | Delta UV $D_{min}$ | Delta Ortho $D_{min}$ |
|---|---|---|---|---|---|---|---|---|
| Example 1a | 70 | 1.0 | 7.3 | −0.2 | excellent | excellent | 0.178 | 0.064 |
| Example 1b | 70 | 0.6 | 7.3 | −0.2 | excellent | not measured | 0.180 | 0.068 |
| Example 1c | 70 | 0.3 | 8.0 | −0.1 | excellent | excellent | 0.169 | 0.061 |
| Example 2a | 60 | 1.0 | 8.1 | 0.3 | excellent | excellent | 0.177 | 0.064 |
| Example 2b | 60 | 0.6 | 8.2 | 0.2 | excellent | excellent | 0.169 | 0.064 |
| Example 2c | 60 | 0.3 | 8.8 | 0.5 | excellent | excellent | 0.171 | 0.063 |
| Example 3a | 50 | 1.0 | 8.5 | 0.6 | excellent | excellent | 0.178 | 0.064 |
| Example 3b | 50 | 0.6 | 8.7 | 0.4 | excellent | excellent | 0.168 | 0.065 |
| Example 3c | 50 | 0.3 | 9.4 | 0.5 | excellent | excellent | 0.166 | 0.060 |
| Example 4 | 50 | 1.0 | 7.9 | −0.6 | excellent | excellent | 0.160 | 0.053 |
| Example 5 | 70 | 0.3 | 8.8 | 0.5 | excellent | excellent | 0.173 | 0.062 |
| Example 6 | 70 | 1.0 | 7.9 | 0.2 | excellent | excellent | 0.224 | 0.077 |
| Comp. Ex. 1a | 70 | 1.0 | 7.1 | 0.8 | excellent | good | 0.195 | 0.068 |
| Comp. Ex. 1b | 70 | 0.6 | 7.4 | 1.0 | excellent | excellent | 0.191 | 0.067 |
| Comp. Ex. 1c | 70 | 0.3 | 8.4 | 1.6 | excellent | not measured | 0.188 | 0.067 |
| Comp. Ex. 2a | 60 | 1.0 | 7.9 | 1.3 | excellent | excellent | 0.196 | 0.069 |
| Comp. Ex. 2b | 60 | 0.6 | 8.2 | 1.4 | excellent | very good | 0.191 | 0.067 |
| Comp. Ex. 2c | 60 | 0.3 | 9.1 | 1.8 | excellent | excellent | 0.188 | 0.066 |
| Comp. Ex. 3a | 50 | 1.0 | 8.8 | 1.7 | excellent | not measured | 0.195 | 0.069 |
| Comp. Ex. 3b | 50 | 0.6 | 9.0 | 1.8 | excellent | excellent | 0.191 | 0.067 |
| Comp. Ex. 3c | 50 | 0.3 | 10.2 | 2.5 | excellent | excellent | 0.187 | 0.067 |
| Comp. Ex. 5 | 70 | 0.3 | 9.1 | 1.2 | excellent | excellent | 0.204 | 0.068 |

TABLE 1-continued

Conductive layers overcoated with transparent magnetic recording layers

| Sample | wt % metal oxide | Covg. g/m² | WER log ohm/sq | Delta R log ohm/sq | Dry adhesion | Wet adhesion | Delta UV $D_{min}$ | Delta Ortho $D_{min}$ |
|---|---|---|---|---|---|---|---|---|
| Comp. Ex. 6 | 70 | 1.0 | 8.9 | 1.0 | excellent | excellent | 0.212 | 0.073 |
| Comp. Ex. 7 | 70 | 0.6 | 9.0 | 3.0 | excellent | excellent | 0.258 | 0.089 |

EXAMPLE 4

An aqueous antistatic coating formulation containing acicular antimony-doped tin oxide conductive particles with mean dimensions of 0.010 μm in cross-sectional diameter and about 0.100 μm in length (by TEM), an aqueous dispersed sulfonated polyurethane binder, and various other additives described below was prepared at nominally 3.5% total solids by weight. The weight ratio of acicular tin oxide to sulfonated polyurethane binder was nominally 50:50. The coating formulation is given below:

| Component | Weight % (wet) |
|---|---|
| Acicular tin oxide[1] | 1.755 |
| Sulfonated polyurethane[2] | 1.755 |
| Wetting aid[3] | 0.100 |
| Deionized water | 96.390 |

[1]FS-10D, Ishihara Techno Corp.
[2]Bayhydrol PR 240, Bayer Corp.
[3]Pluronic F88 BASF Corp.

The above coating formulation was applied to a moving web of 4 mil (100 μm) thick poly(ethylene naphthalate) film support using a coating hopper so as to provide a nominal total dry coverage of 1 g/m². The film support had been corona discharge treated immediately prior to coating. The electrically-conductive layer was overcoated with a transparent magnetic recording layer as described in Examples 1–3. A description of the conductive layer in the magnetic backing packages, the corresponding internal resistivity (WER) value, ΔR value, dry adhesion and wet adhesion results, and net ultraviolet and optical densities ($\Delta D_{min}$) are given in Table 1.

COMPARATIVE EXAMPLES 1–3

Aqueous antistatic coating formulations containing acicular antimony-doped tin oxide conductive particles with mean dimensions of 0.010 μm in cross-sectional diameter and about 0.100 μm in length (by TEM), an aqueous dispersed non-sulfonated polyurethane binder as described in U.S. Pat. No. 5,718,995, and various other additives described below were prepared at nominally 3.0% total solids by weight. The weight ratios of acicular tin oxide to non-sulfonated polyurethane binder were nominally 70:30, 60:40, and 50:50 for the conductive layers of Comparative Examples 1, 2, and 3, respectively. The coating formulations are given below:

| | Weight % (wet) | | |
|---|---|---|---|
| Component | Comp. Ex. 1 | Comp. Ex. 2 | Comp. Ex. 3 |
| Acicular tin oxide[1] | 2.050 | 1.781 | 1.506 |
| Polyurethane[2] | 0.878 | 1.187 | 1.506 |
| Wetting aid[3] | 0.033 | 0.033 | 0.033 |
| Deionized water | 97.039 | 96.999 | 96.955 |

[1]FS-10D, Ishihara Techno Corp.
[2]Witcobond W-236, Witco Corp.
[3]Triton X-100, Rohm & Haas The above coating formulations were applied to a moving web of 4 mil (100 μm) thick poly(ethylene terephthalate) film support using a coating hopper so as to provide nominal total dry coverages of 1 g/m² (Comparative Examples 1a, 2a, and 3a), 0.6 g/m² (Comparative Examples 1b, 2b, and 3b,), and 0.3 g/m² (Comparative Examples 1c, 2c, and 3c). The film support had been coated previously with a typical primer layer consisting of a terpolymer latex of acrylonitrile, vinylidene chloride, and acrylic acid. The electrically-conductive layers were overcoated with a transparent magnetic recording layer as described in Examples 1–3. Descriptions of the conductive layers in the magnetic backing packages, the corresponding internal resistivity (WER) values, ΔR values, dry adhesion and wet adhesion results, and net ultraviolet and optical densities ($\Delta D_{min}$) are given in Table 1.

EXAMPLE 5

An aqueous antistatic coating formulation containing granular antimony-doped tin oxide conductive particles with an average primary particle size of 0.010 to 0.015 μm (by BET), an aqueous dispersed sulfonated polyurethane binder, and various other additives described below was prepared at nominally 3.5% total solids by weight. The weight ratio of granular tin oxide to sulfonated polyurethane binder was nominally 70:30. The coating formulation is given below:

| Component | Weight % (wet) |
|---|---|
| Granular tin oxide[1] | 2.378 |
| Sulfonated polyurethane[2] | 1.019 |
| Wetting aid[3] | 0.100 |
| Deionized water | 96.503 |

[1]SN-100D, Ishihara Techno Corp.
[2]Bayhydrol PR 240, Bayer Corporation
[3]Pluronic F88, BASF Corp.

The above coating formulation was applied to a moving web of 4 mil (100 μm) thick poly(ethylene naphthalate) film support using a coating hopper so as to provide a nominal total dry coverage of 0.3 g/m². The film support had been coated previously with a typical primer layer consisting of a terpolymer latex of acrylonitrile, vinylidene chloride, and acrylic acid. The electrically-conductive layer was overcoated with a transparent magnetic recording layer as described in Examples 1–3. A description of the conductive layer in the magnetic backing package, the corresponding internal resistivity (WER) value, ΔR value, dry adhesion and wet adhesion results, and net ultraviolet and optical densities ($\Delta D_{min}$) are given in Table 1.

EXAMPLE 6

An aqueous antistatic coating formulation containing granular zinc antimonate conductive particles with an average primary particle size of 0.010 to 0.030 μm (by BET), aqueous dispersed sulfonated polyurethane binder, and various other additives described below was prepared at nominally 3.5% total solids by weight. The weight ratio of zinc antimonate to sulfonated polyurethane binder was nominally 70:30. The coating formulation is given below:

| Component | Weight % (wet) |
|---|---|
| Zinc antimonate[1] | 2.378 |
| Sulfonated polyurethane[2] | 1.019 |
| Wetting aid[3] | 0.100 |
| Deionized water | 96.503 |

[1]Celnax CX-Z, Nissan Chemical America, Inc.
[2]Bayhydrol PR 240, Bayer Corporation
[3]Pluronic F88, BASF Corp.

The above coating formulation was applied to a moving web of 4 mil (100 μm) thick poly(ethylene naphthalate) film support using a coating hopper so as to provide a nominal total dry coverage of 1.0 g/m². The film support had been coated previously with a typical primer layer consisting of a terpolymer latex of acrylonitrile, vinylidene chloride, and acrylic acid. The electrically-conductive layer was overcoated with a transparent magnetic recording layer as described in Examples 1–3. A description of the conductive layer in the magnetic backing package, the corresponding internal resistivity (WER) value, ΔR value, dry adhesion and wet adhesion results, and net ultraviolet and optical densities ($\Delta D_{min}$) are given in Table 1.

COMPARATIVE EXAMPLE 5

An aqueous antistatic coating formulation containing granular antimony-doped tin oxide conductive particles with an average primary particle size of 0.005 to 0.015 μm (by BET), an aqueous dispersed non-sulfonated polyurethane binder as disclosed in U.S. Pat. No. 5,718,995, and various other additives described below was prepared at nominally 3.0 percent total solids by weight. The weight ratio of granular tin oxide to sulfonated polyurethane binder was nominally 70:30. The coating formulation is given below:

| Component | Weight % (wet) |
|---|---|
| Granular tin oxide[1] | 2.050 |
| Polyurethane[2] | 0.878 |
| Wetting aid[3] | 0.033 |
| Deionized water | 97.039 |

[1]SN-100D, Ishihara Techno Corp.
[2]Witcobond W-236, Witco Corporation
[3]Triton X-100, Rohm & Haas The above coating formulation was applied to a moving web of 4 mil (100 μm) thick poly(ethylene naphthalate) film support using a coating hopper so as to provide a nominal total dry coverage of 0.3 g/m². The film support had been coated previously with a typical primer layer consisting of a terpolymer latex of acrylonitrile, vinylidene chloride, and acrylic acid. The electrically-conductive layer was overcoated with a transparent magnetic recording layer as described in Examples 1–3. A description of the conductive layer in the magnetic backing packages, the corresponding internal resistivity (WER) value, ΔR value, dry adhesion and wet adhesion results, and net ultraviolet and optical densities ($\Delta D_{min}$) are given in Table 1.

COMPARATIVE EXAMPLE 6

An aqueous antistatic coating formulation containing granular zinc antimonate conductive particles with an average primary particle size of 0.010 to 0.030 μm (by BET), an aqueous dispersed non-sulfonated polyurethane binder, and various other additives described below was prepared at nominally 4.3% total solids by weight. The weight ratio of zinc antimonate to sulfonated polyurethane binder was nominally 70:30. The coating formulations is given below:

| Component | Weight % (wet) |
|---|---|
| Zinc antimonate[1] | 2.968 |
| Polyurethane[2] | 1.272 |
| Wetting aid[3] | 0.033 |
| Deionized water | 95.727 |

[1]Celnax CX-Z, Nissan Chemical America, Inc.
[2]Witcobond W-236, Witco Corporation
[3]Triton X-100, Rohm & Haas The above coating formulation was applied to a moving web of 4 mil (100 μm) thick poly(ethylene naphthalate) film support using a coating hopper so as to provide a nominal total dry coverage of 1.0 g/m². The film support had been coated previously with a typical primer layer consisting of a terpolymer latex of acrylonitrile, vinylidene chloride, and acrylic acid. The electrically-conductive layer was overcoated with a transparent magnetic recording layer as described in Examples 1–3. A description of the conductive layer in the magnetic backing packages, the corresponding internal resistivity (WER) value, ΔR value, dry adhesion and wet adhesion results, and net ultraviolet and optical densities ($\Delta D_{min}$) are given in Table 1.

COMPARATIVE EXAMPLE 7

An aqueous antistatic coating formulation containing acicular antimony-doped tin oxide conductive particles with mean dimensions of 0.010 μm in cross-sectional diameter and about 0.100 μm in length (by TEM), an aqueous dispersed sulfonated polyester binder, and various other additives described below was prepared at nominally 3.0% total solids by weight. The weight ratio of acicular tin oxide to sulfonated polyester binder was nominally 70:30. The coating formulations is given below:

| Component | Weight % (wet) |
|---|---|
| Acicular tin oxide[1] | 1.043 |
| Sulfonated polyester[2] | 1.755 |
| Dispersing aid[3] | 0.157 |
| Wetting aid[4] | 0.020 |
| Deionized water | 97.025 |

[1]FS-10P, Ishihara Techno Corp.
[2]AQ55D, Eastman Chemical Company
[3]Dequest 2006, Monsanto Chemical Co.
[4]Triton X-100, Rohm & Haas The above coating formulation was applied to a moving web of 4 mil (100 μm) thick poly(ethylene terephthalate) film support using a coating hopper so as to provide a nominal total dry coverage of 0.6 g/m². The film support had been coated previously with a typical primer layer consisting of a terpolymer latex of acrylonitrile, vinylidene chloride, and acrylic acid. The electrically-conductive layer was overcoated with a transparent magnetic recording layer as described in Examples 1–3. A description of the conductive layer in the magnetic backing package, the corresponding internal resistivity (WER) value, ΔR value, dry adhesion and wet adhesion results, and net ultraviolet and optical densities ($\Delta D_{min}$) are given in Table 1.

The above Examples demonstrate that conductive layers of this invention containing acicular metal-containing conductive particles dispersed in a sulfonated polyurethane film-forming binder exhibit smaller increases in resistivity (ΔR) and comparable WER values after overcoating with a magnetic recording layer than conductive layers of prior art containing acicular particles dispersed in a non-sulfonated polyurethane binder for the equivalent weight ratios of acicular conductive particles to polyurethane binder and equivalent dry weight coverages of the electrically-conductive layers. For example, the conductive layers of Examples 1a–c essentially do not change resistivity when overcoated, whereas the conductive layers of Comparative Examples 1a–c containing a non-sulfonated polyurethane binder exhibit an increase in resistivity of about 1 log ohm/square after overcoating, and the conductive layer of Comparative Example 7 containing a sulfonated polyester exhibits an increase in resistivity of about 3 log ohm/sq. The conductive layers of Examples 2 and 3 exhibit an increase in resistivity of only about 0.5 log ohm/sq compared with an increase of about 1.5 log ohm/sq for the conductive layers of Comparative Examples 2 and 3 containing a non-sulfonated polyurethane binder. Thus, one key advantage provided by the conductive layers of the present invention is a minimization of the increase in resistivity resulting from superposing a magnetic recording layer or other type of layer on the conductive layer relative to conductive layers of prior art.

A further advantage provided by the conductive layers of this invention is that the $\Delta UV\ D_{min}$ values of the magnetic backing packages are typically less than prior art magnetic backings containing conductive layers having comparable concentrations of acicular conductive particles. In addition, sulfonated polyurethane binders of the present invention provide excellent adhesion to both underlying and overlying layers.

While there has been shown and described what are presently considered to be the preferred embodiments of the invention, various modifications and alterations will be obvious to those skilled in the art. All such modifications and alterations are intended to fall within the scope of the appended claims.

The invention has been described in detail with particular reference to certain preferred embodiments thereof, but it will be understood that variations and modifications can be effected within the spirit and scope of the invention.

What is claimed is:

1. A multilayer imaging element comprising:
   a support;
   at least one image-forming layer superposed on the support;
   at least one transparent electrically-conductive layer superposed on the support comprising electronically-conductive acicular metal-containing particles dispersed in a sulfonated polyurethane film-forming binder; and
   a transparent magnetic recording layer comprising magnetic particles dispersed in a film-forming binder.

2. The imaging element of claim 1, wherein the electronically-conductive, acicular metal-containing particles comprise less than 0.020 μm in cross-sectional diameter and less than 0.50 μm in length.

3. The imaging element of claim 2, wherein the acicular electronically-conductive acicular metal-containing particles comprise a volume percentage of from about 2 to 70 volume percent of the electrically-conductive layer.

4. The imaging element of claim 1, wherein the electrically-conductive layer has a total dry weight coverage of from about 0.02 to about 1 g/m².

5. The imaging element of claim 1, wherein the electrically-conductive, acicular metal-containing particles comprise a metal oxide selected from the group consisting of tin oxide, indium sesquioxide, zinc oxide, titanium dioxide, titanium suboxide, or titanium oxynitride.

6. The imaging element of claim 1, wherein the electronically-conductive, acicular metal-containing particles comprise antimony-doped tin oxide particles.

7. The imaging element of claim 1, wherein the sulfonated polyurethane film-forming binder comprises an anionic, aliphatic sulfonated polyurethane.

8. The imaging element of claim 1, wherein said support is selected from the group consisting of cellulose nitrate, cellulose acetate, cellulose acetate butyrate, cellulose acetate propionate, poly(vinyl acetal), poly(carbonate), poly (styrene), poly(ethylene terephthalate) and poly(ethylene naphthalate).

9. The imaging element as claimed in claim 1, wherein the magnetic particles comprise cobalt surface modified γ-iron oxide particles or magnetite particles.

10. The imaging element of claim 9, wherein the cobalt surface-modified γ-iron oxide particles or magnetite particles comprise a dry weight coverage of from 10 mg/m² to 1000 mg/m².

11. The imaging element of claim 1, wherein the film-forming binder of the transparent magnetic recording layer comprises cellulose diacetate, cellulose triacetate or polyurethane.

12. A photographic film comprising:
   a support;
   a silver halide emulsion layer superposed on a first side of said support;
   an electrically-conductive layer superposed on a second side of said support, wherein said electrically-conductive layer comprises electronically-conductive acicular metal-containing particles dispersed in a sulfonated polyurethane film-forming binder; and
   a transparent magnetic recording layer overlying said electrically-conductive layer comprising magnetic particles dispersed in a film-forming binder.

13. A thermally-processable imaging element comprising:
   a support;
   an imaging layer superposed on a first side of said support;
   an electrically-conductive layer superposed on a second side of said support, wherein said electrically-conductive layer comprises electronically-conductive acicular metal-containing particles dispersed in a sulfonated polyurethane film-forming binder; and
   a transparent magnetic recording layer overlying said electrically-conductive layer comprising magnetic particles dispersed in a film-forming binder.

* * * * *